United States Patent [19]

Hablov et al.

[11] Patent Number: 5,530,429

[45] Date of Patent: Jun. 25, 1996

[54] ELECTRONIC SURVEILLANCE SYSTEM

[75] Inventors: Dimitri V. Hablov; Oleg I. Fisun; Lev N. Lupichev; Viktor V. Osipov; Viktor A. Schestiperov, all of Moscow, Russian Federation; Richard Schimko, Berlin, Germany

[73] Assignee: Borus Spezialverfahren und -gerate im Sondermaschinenbau GmbH, Berlin, Germany

[21] Appl. No.: 161,133

[22] Filed: Dec. 3, 1993

[30] Foreign Application Priority Data

Dec. 4, 1992 [DE] Germany ............ 42 41 648.5

[51] Int. Cl.⁶ ............................................. G08B 13/18
[52] U.S. Cl. .................................... 340/552; 342/192
[58] Field of Search ................. 340/552; 342/90, 342/28, 192

[56] References Cited

U.S. PATENT DOCUMENTS

| | | | |
|---|---|---|---|
| 3,823,261 | 7/1974 | Bolsey | 178/6.8 |
| 3,932,703 | 1/1976 | Bolsey | 178/6.8 |
| 4,027,303 | 5/1977 | Neuwirth | 340/552 |
| 4,197,537 | 4/1980 | Follen | 340/552 |
| 4,400,700 | 8/1983 | Rittenbach | |
| 4,408,224 | 10/1983 | Yoshida | 358/108 |
| 4,420,238 | 12/1983 | Felix | |
| 4,484,193 | 11/1984 | Bellew | |
| 4,864,307 | 9/1989 | Portage | 342/192 |
| 4,961,039 | 10/1990 | Roth | 342/192 |
| 4,967,183 | 10/1990 | D'Ambrosia | 340/552 |
| 5,049,858 | 9/1991 | Price | 340/552 |
| 5,077,548 | 12/1991 | Dipoala | 340/552 |
| 5,150,099 | 9/1992 | Lienau | |
| 5,150,123 | 9/1992 | Orlowski | 342/28 |
| 5,196,826 | 3/1993 | Whiting | 342/28 |
| 5,233,354 | 8/1993 | Tamauchi | 342/28 |

FOREIGN PATENT DOCUMENTS

| | | |
|---|---|---|
| 58032 | 8/1982 | European Pat. Off. |
| 490713A1 | 6/1992 | European Pat. Off. |
| 2645307 | 10/1990 | France |
| 3200147 | 7/1983 | Germany |
| 3832428A1 | 6/1989 | Germany |
| 2184627 | 6/1987 | United Kingdom |
| WO89/11710 | 11/1989 | WIPO |

OTHER PUBLICATIONS

"An X-Bank Microwave Life-Detection System"–IEEE Transactions On Biomedical Engineering, vol. BME-33, No. 7, Jul. 1986.

European patent search for parent European patent application EP 93 25 0331, Apr. 19, 1994.

*Primary Examiner*—Brent A. Swarthout
*Assistant Examiner*—Albert K. Wong
*Attorney, Agent, or Firm*—Chilton, Alix & Van Kirk

[57] ABSTRACT

An electronic surveillance system for detecting unauthorized persons within a building. The system comprising a microwave transmitting/receiving device which transmits a microwave signal into the area under surveillance and receives microwave signals reflected from the area. The microwave signal having frequencies corresponding to the life functions of any living beings present in the area. The transmitting/receiving device comprising a signal conditioning device, a memory device, and a comparator unit. The signal conditioning device adjusts the amplitude and phase of a portion of the outgoing microwave signal and adds it to the incoming microwave signal, eliminating the carrier wave. The resultant actual signal is transmitted to the comparator unit which also receives a signal from the memory device comprising characteristic frequencies representing authorized occupants. If the results of the comparison are above a predetermined threshold, an alarm is generated.

19 Claims, 9 Drawing Sheets

ELECTRONIC SURVEILLANCE SYSTEM

DESCRIPTION

1. Field of the Invention

The invention relates to an electronic surveillance system for sensing living beings behind a wall or in a building on the basis of a reflection of a wave field radiated into the spatial area to be subjected to surveillance, having a microwave transmitting/receiving device for generating and radiating the wave field, and for receiving and conditioning a signal reflected from the living being, and a device for outputting a signal indicating presence.

2. Background of the Invention

It is known to maintain surveillance over buildings or areas of land by electronic means in such a way that the entry by or the presence of persons results in the partial masking or reflection of a wave field to which the building or land is subjected, whereby a detection signal is generated and ultimately an alarm may be set off.

As detection fields, use is made in particular of mechanical (for example ultrasonic) or electromagnetic wave fields of different frequencies.

It is further known to use in an analogous way the wave field emanating from a person as a detection field. For example, such an electronic surveillance system based on the infrared radiation emanating from persons is described in DE 38 32 428 A1.

Finally, the use of microwave radiation for movement detection on open land or inside premises which is based on the modulation of a microwave beam by objects moving in the area exposed to the radiation is also known.

Wherever they have to make do without additional optical recording devices, the said processes normally do not permit a distinction between persons authorized and unauthorized to be present in an area to be subjected to surveillance, therefore are suitable only to a limited extent or not suitable at all for the surveillance of areas—in particular buildings which cannot be seen into—in which authorized and unauthorized persons may be present.

Furthermore, also known are search devices which operate with microwaves and are used for locating persons cut off from the outside world by earthquakes or avalanches.

The use of microwaves for locating buried persons is based on the fact that microwaves are to some extent capable of penetrating rubble and rock debris. In addition, microwaves have the characteristic that, upon reflection from a living organism, they undergo a change, whereas the wave component which is reflected by the surroundings of the living organism does not exhibit any modulation.

K. Chen et al. "An X-band microwave life-detection system", IEE Transactions on biomedical engineering, Vol. BME 33, No. 7, Jul. 1986 discloses such a life indicator which operates with microwaves and the scanning signals of which are radiated into the area to be investigated at a frequency of 10 GHz, concentrated by a directional aerial.

If there is a living person there, the signal reflected from the scanned area has an unmodulated component and a component modulated by the body functions, specifically breathing and heartbeat, of the person cut off from the outside world. The unmodulated component of the reflected signal is eliminated by a compensation loop which can be controlled in its phase and attenuation constant.

The compensation loop comprises a directional coupler, which is arranged downstream of the microwave oscillator and amplifier of the microwave transmitter and in which part of the transmitting power is branched off, a variable attenuator, a phase shifter arranged downstream of the latter, and a further directional coupler, by which the branched-off part of the transmitted signal is mixed in again with the received signal. Attenuator and phase shifter are set such that the unmodulated signal component of the received signal is eliminated. In the case of other configurations of the invention, the elimination in the received signal of the unmodulated component, which corresponds to the transmitted signal, can also be carried out by filtering. In this case, use may also be made in particular of correlation methods which detect the unmodulated signal on the basis of similarity criteria and eliminate it.

The informational content of the modulated component of the reflected signal is thus selected by comparison with the transmitted (scanning) signal.

In the cited publication there is also described a modification of the process suitable for contactless patient monitoring which makes do without a directional aerial and with an output power of 0.1 mW.

The known processes and equipment used for locating persons involved in accidents and operating with microwaves are, however, suitable only to a limited extent for a preventive surveillance of buildings.

The fundamental reason for this is that in such buildings there are often (authorized) persons or else domestic animals, the bodies of which reflect microwave radiation, pulse frequency and breathing generating modulated microwave reflection signals which, on the one hand, must not result in an alarm being set off and, on the other hand, mask the additional signals originating from unauthorized persons—in particular if there are a relatively large number of authorized persons present in the area in question. By the elimination of known signal patterns, generally the signal patterns of living beings which are not to be paid any particular attention in the search are excluded from the indication.

SUMMARY OF THE INVENTION

The invention is based on the object of providing an electronic surveillance system of the generic type mentioned at the beginning by which the presence of unknown persons in an area under surveillance—in particular a building—which is also used by authorized persons and/or animals can be established.

An advantageous area of application is that of increasing accuracy in the detection of living beings, preferably persons, present without authorization in buildings which are under the control of a mobile security service.

This object is achieved by an electronic surveillance system for sensing living beings behind a wall or in a building on the basis of a reflection of a wave field radiated into the spatial area to be subjected to surveillance, having a microwave transmitting/receiving device for generating and radiating the wave field, and for receiving and conditioning a signal reflected from the living being, and a device for outputting a signal indicating presence, characterized by a first signal-conditioning device, provided in the microwave transmitting/receiving device, for elimination in the received signal of the unmodulated component corresponding to the transmitted signal already contained in the latter, a second signal-conditioning device, which is arranged downstream of the microwave transmitting/receiving device and further conditions the microwave signal reflected from the area under surveillance, modulated by the body oscillations of any living being present in the area, and conditioned by the first signal-conditioning device, with a frequency and/or correlation analysis being executed to supply an actual signal quantity, a first memory device for storing and outputting at least one model signal quantity, which describes a normal (model) state of the area to be subjected to surveillance and/or comprises characteristic oscillation spectra registered in advance, and a first comparator unit for comparison of the actual signal quantity, supplied by the second signal-conditioning device, with the at least one model signal quantity, output from the first memory device, which comparator unit outputs an output value quantity characterizing the result of the comparison, the output of the comparator unit being connected to the input of the signal device, which outputs a signal dependent on the degree of matching.

The invention embraces a recognition of the idea that intruders can be detected in principle by means of an electronic surveillance system of the generic type once the detection principle used can distinguish between different living beings present in the area in question.

The invention makes it possible furthermore, in an advantageous way, that an alarm can be set off in a surveillance operation if there is no match in a comparison of the sensed signals with predetermined comparison values which correspond to the signals to be sensed in a case where there is no disturbance, that is to say if there are no or only authorized persons present in the premises to be protected.

Furthermore, it is favourable if every human or every sizeable animal in an area to be subjected to surveillance—in particular buildings which cannot be (completely) seen into—has due to its breathing and heart function and further body functions a characteristic mechanical oscillation spectrum which characterizes the said human or animal—assuming sufficiently accurate analysis—in the manner of a fingerprint. Consequently, the distinguishing mentioned above is possible on the basis of this oscillation spectrum.

A selectively operating electronic surveillance system (in particular for protecting buildings against unauthorized use) can thus be realised if a signal pattern produced at an earlier time by means of microwaves of the buildings to be subjected to surveillance, which represents the normal (or model) state of the building with regard to the presence of persons or other living beings, is compared with a signal pattern determined by security staff or recorded in some other way. A measure of the deviation between the two signal patterns, to be suitably defined in advance, on the basis of the presence of additional persons in the building, unauthorized at the time of surveillance, is a criterion for setting off an alarm or for the initiation of corresponding security measures.

The execution of such a comparison is facilitated or, under unfavourable conditions, made possible in the first place if the receiving circuit is designed such that it permits a measurement even in the case of very small signal-to-noise ratios and without overdriving, in order to ensure an unfalsified sensing of the modulation frequencies (i.e. consequently of the body oscillation frequencies). For this purpose, an automatic sensitivity control is advantageously provided.

For carrying out the data comparison, it is of particular advantage if the signals determined, sensed in the time domain, are subjected to a frequency analysis, in particular in the form of a fast Fourier transformation (FFT). The FFT-conditioned signals in this case respectively represent a frequency spectrum.

The accuracy of detection is increased in an advantageous way by the scanning of a building to be subjected to surveillance being performed by scanning in the sense of a spatial scanning with a highly concentrated microwave beam by means of a correspondingly designed directional aerial with variable alignment. The changing of the alignment of the aerial is in this case preferably performed electronically.

According to a preferred configuration of the invention, the electronic surveillance system for the mobile surveillance of a plurality of buildings for the purpose of establishing persons who have entered one or more of these buildings without authorization has first and second memory devices, the memory addresses $Z_1$ to $Z_n$ of which are assigned to the individual buildings to be subjected to surveillance and the memory content of which comprises signal quantities relating to building-specific features for the reference or normal situation, premises-related security measures for the event of unauthorized use of a building, time-variable occupancy and use criteria, positional data of the buildings in a respective area of land and of the location of a vehicle for carrying out the mobile surveillance and building-specific additional information.

After compensation of their unmodulated component and automatic level setting, the microwaves reflected from the building and picked up by the mobile detector of the surveillance system are subjected to a fast Fourier transformation and then compared with the signal quantities available in the memory device and assigned to the same building or section of building or land.

In the signal processing unit, a device is provided for the optional accumulation of a plurality of measuring signals, which is put into operation if the signal-to-noise ratio of an individual measurement is not adequate for obtaining a Fourier transform which is comparable with respect to noise with the one which is stored.

The memory devices are designed such that they can be cyclically driven by a multiplexer. Putting the sending and receiving devices into operation and reading out the building-specific signal quantities from the memory devices of the surveillance system is always performed whenever the vehicle used for mobile surveillance has taken up a location which is defined and can be checked by a separate control system.

For setting off an alarm owing to persons present in the building without authorization, it is necessary that the deviation of the stored (model) signal quantities from the detected (actual) signal quantities satisfies predetermined criteria or—more simply—exceeds a certain amount. A comparator unit, operating in an advantageous way by a correlation method, and a suitably dimensioned threshold stage bring about the required setting off of the alarm, for instance on an indicating device, when there is a corresponding signal-quantity deviation. For the reading out of the signal data, in particular of the positional data for the individual buildings, from the second memory device there is provided a multiplexer, which is driven by a random generator. As a result, in an advantageous way, a manipulation of the sequence of surveillance of the individual premises—and consequently of the constitution of a control journey—is avoidable and results in an increase in the effectiveness of the surveillance measures.

Other advantageous further developments of the invention are characterized in subclaims and/or are presented in

BRIEF DESCRIPTION OF THE DRAWINGS

In FIG. 1a a block diagram of an exemplary embodiment of the electronic surveillance system is represented in schematized form, the main elements of which are a microwave transmitting/receiving device 9 with a transmitter 9.1 and a receiver 9.2, a first and a second memory device 2 and 4, in which the main surveillance-specific quantities of data of individual buildings to be subjected to surveillance are stored, and a comparator unit 11.

Figure 1A:
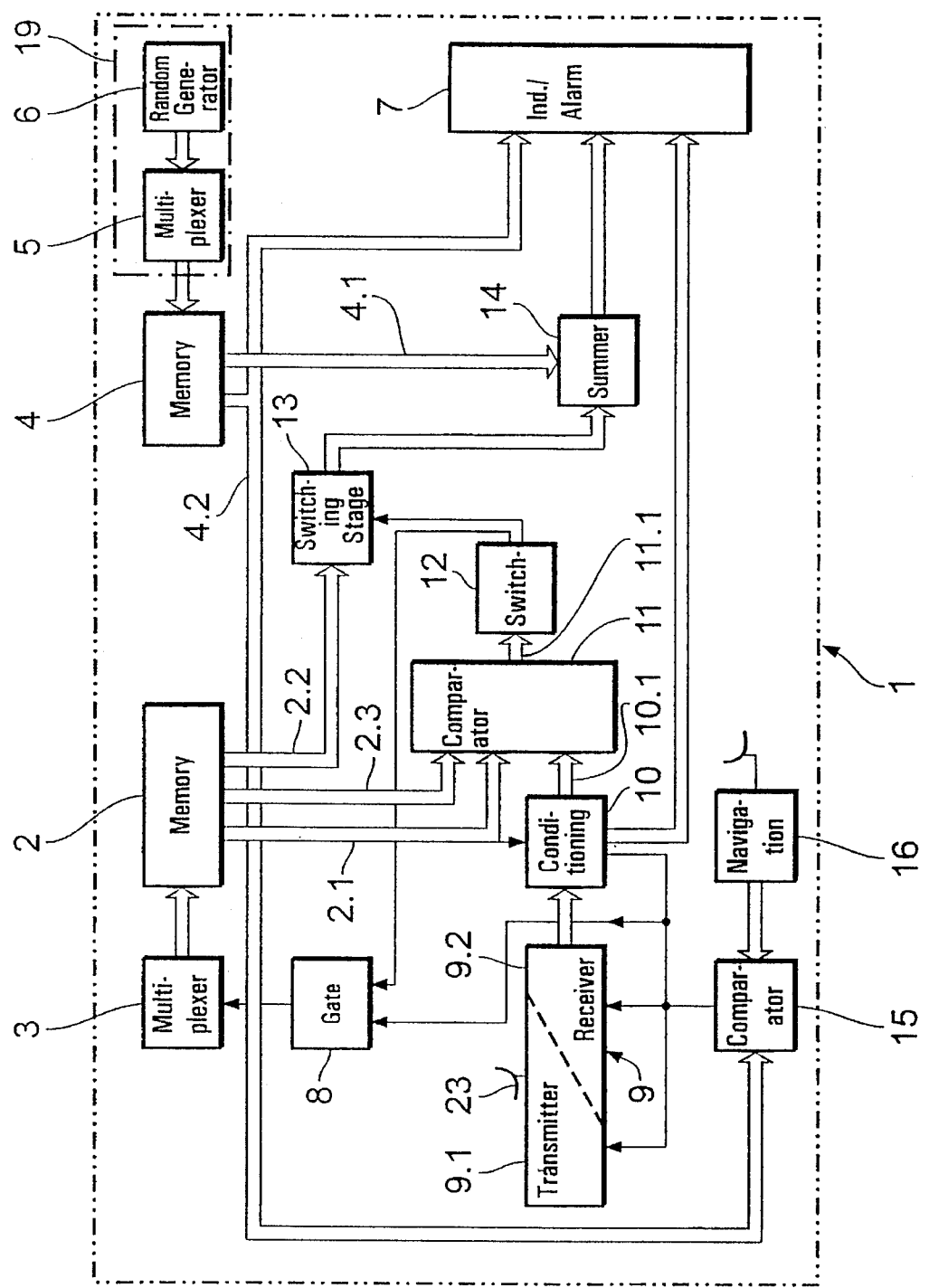
FIG. 1a shows a block diagram of a preferred embodiment of the invention in schematized representation.

By means of an aerial 23, the transmitter 9.1 transmits into the area to be subjected to surveillance a surveillance signal which, partially reflected in the said area, is fed as a received signal via the aerial 23 to the receiver 9.2. From there, it passes to a conditioning unit, which obtains from it an actual signal quantity 10.1.

The first memory device 2 sends signal quantities 2.1 and 2.3 (building features under normal conditions and current occupancy criteria for a particular building $Z_x$) to the comparator unit 11, which is also sent the actual signal quantity 10.1.

The comparator unit is designed such that it executes a comparison of the model signal quantities with the associated actual signal quantity by a correlation method on the basis of frequency spectra formed from the signal quantities by fast Fourier transformation.

The result of the comparison is fed to a threshold switch 12. The exceeding of a degree of permissible deviation between the model and actual signal quantities characterizing the building to be subjected to surveillance, predetermined in advance to avoid any false alarm caused by measuring errors, results in activation of the switching stage 13, by which the signal quantities 2.2 (premises-related security measures from the first memory device 2) and 4.1 (building-specific additional information from the second memory device 4) pass via a summing circuit 14 to the alarm-signalling device or indicating unit 7, where the setting off of an alarm is performed with a simultaneous display of all information relevant for service personnel (cf. the description with respect to FIG. 5).

The reading out of the signal quantities from the memory addresses assigned to the individual buildings $Z_1$ to $Z_n$ is performed from the two memory devices 2 and 4 in each case by an external control 3 and 19, respectively.

The control 19 for the memory device 4 with the signal quantities 4.2 (positional data of the buildings to be subjected to surveillance) comprises a cyclical multiplexer 5 and a random generator 6 driving the latter. The selection of the building to undergo a control check first and of the buildings subsequently to undergo control checks is in this way performed randomly and, advantageously in a way safeguarded against any manipulation.

The positional data 4.2 are displayed on the indicating unit 7 and at the same time fed to a further comparator unit 15, which by means of a navigation system 16 allocates to the mobile microwave transmitting/receiving device installed in a vehicle the predetermined location for the specific surveillance task.

Once this location has been taken up, the transmitter 9.1 and the receiver 9.2 are switched on. The result of location comparison is fed at the same time to a gate circuit 8, which is also connected to the comparator unit 11. If the recognition signal quantities of the building concerned are verified by the comparator unit and if the microwave transmitting/receiving device 9 is in operation, the cyclical multiplexer 3 is stopped precisely at the memory address $Z_x$ which corresponds to the building specifically under investigation.

Consequently, if there is a firm degree of deviation between the model signal quantities 2.1, 2.3 and the actual signal quantity 10.1, for the purpose of issuing alarm information, the signal quantities 2.2 (security measures on establishing unauthorized use of the building) are displayed together with the positional data and building-specific additional information on the indicating or alarm-signalling device 7.

Practical results have shown that, surprisingly, in a frequency range from 1.3 to 1.6 GHz the microwave power required for measuring body signals through structural surrounds is particularly low, so that this frequency range is particularly well suited for a surveillance system.

Figure 1B:
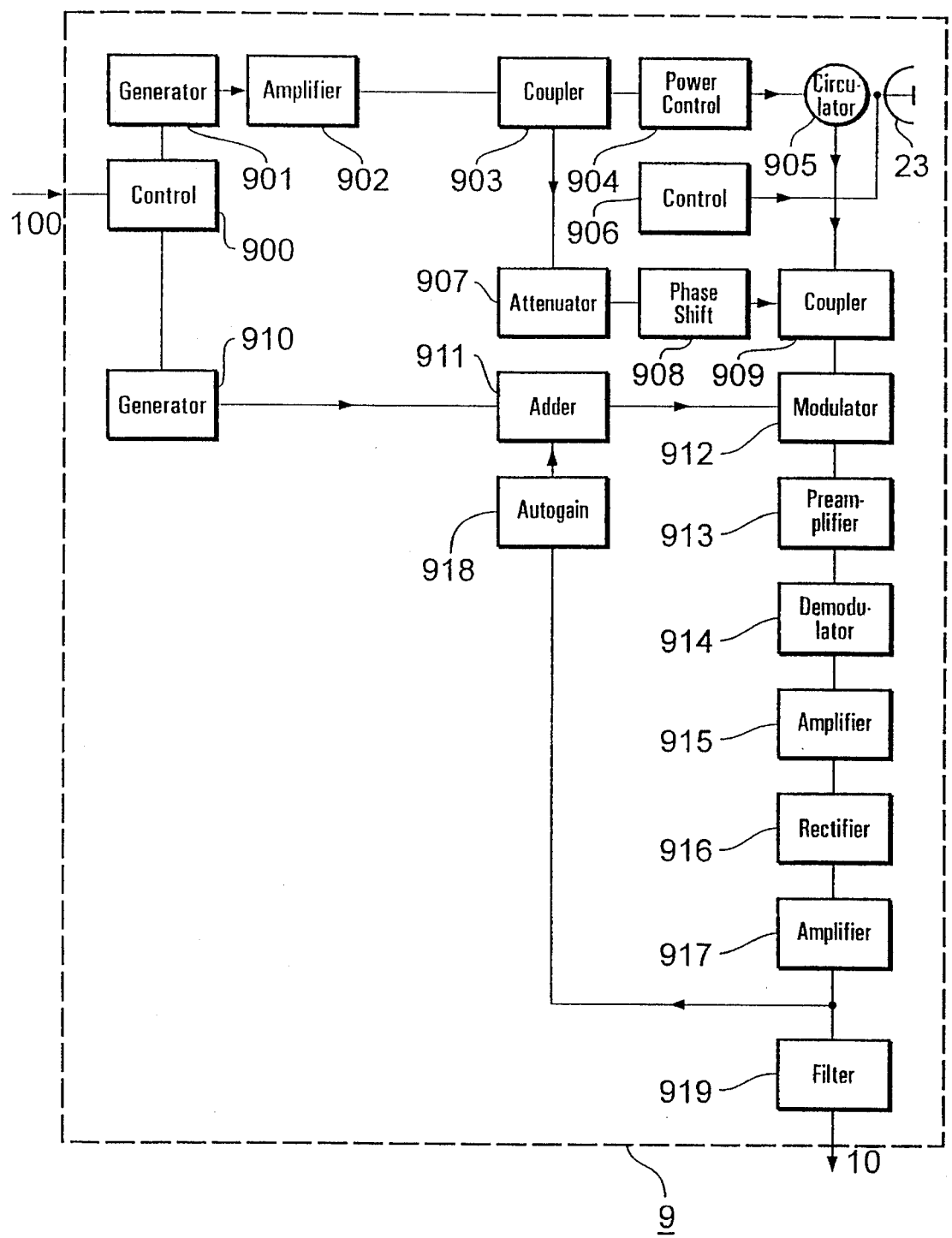
FIG. 1b shows the schematized representation of the microwave transmitting/receiving device shown in FIG. 1a, FIG. 1c shows the schematized representation of the signal processing device shown in FIG. 1b.

FIG. 1b shows the configuration of the microwave transmitting/receiving device 9 in detailed form.

The device 9 is controlled by a control 900. In response to a corresponding command of the control 900 a microwave generator 901 emits a microwave signal with a power of 20 mW, which is fed to an amplifier 902, which amplifies it to a power of 200 mW. The output of the said amplifier is connected to a directional or voltage coupler 903, which branches off part of the signal power, while the main part is fed via a power control stage 904 to a circulator 905 and from the latter to a combined transmitting/receiving aerial 23, via which the microwaves are radiated into the area to be subjected to surveillance.

The aerial has a pronounced directional characteristic and is guided step by step over a spatial area to be subjected to surveillance—in dependence on the size of the area and the distance of the measuring vehicle from the latter—by an aerial control 906 known per se.

The required data are fed to the aerial control from the comparator unit 15, which receives them in the way described above.

The microwave signals reflected from the area to be subjected to surveillance are received by the aerial 23 and passed to the directional or voltage coupler 909 where the component of the transmitted signal removed in the directional coupler 903 and adjusted in amplitude and phase in the attenuator 907 and the controllable phase shifter 908 is added to the received signal such that the unmodulated component of the received signal and the branched-off transmitted signal cancel each other out, so that only the modulated component of the received signal remains for further signal processing.

This signal is fed to a modulator 912, where it is modulated with a modulation voltage generated by an audio-frequency generator 910, likewise controlled by means of the control 900, and fed via an adding stage 911, the function of which is explained further below.

The signal passes via a microwave preamplifier 913, a demodulator 914, a narrow-band amplifier 915, a rectifier 916 and a low-frequency amplifier 917 to a branching point, from which it is fed on the one hand via a band-pass filter 919 finally to the signal processing unit 10, on the other hand via an automatic gain control circuit 918 of the conventional type to the adding stage 911. There, it is impressed onto the modulation voltage which is then fed to the modulator 912.

The additional modulation of the modulated component of the microwave received signal with an audio-frequency voltage obtained in its amplitude by a feedback from the signal itself serves for automatically ensuring an optimum operating range of the stages 913 to 919 and consequently for improving the signal-to-noise ratio and for preventing overdriving in the signal conditioning path, which would falsify the measured frequency spectra and consequently have terrible effects on the information value of the subsequently obtained actual signals.

Figure 1C:
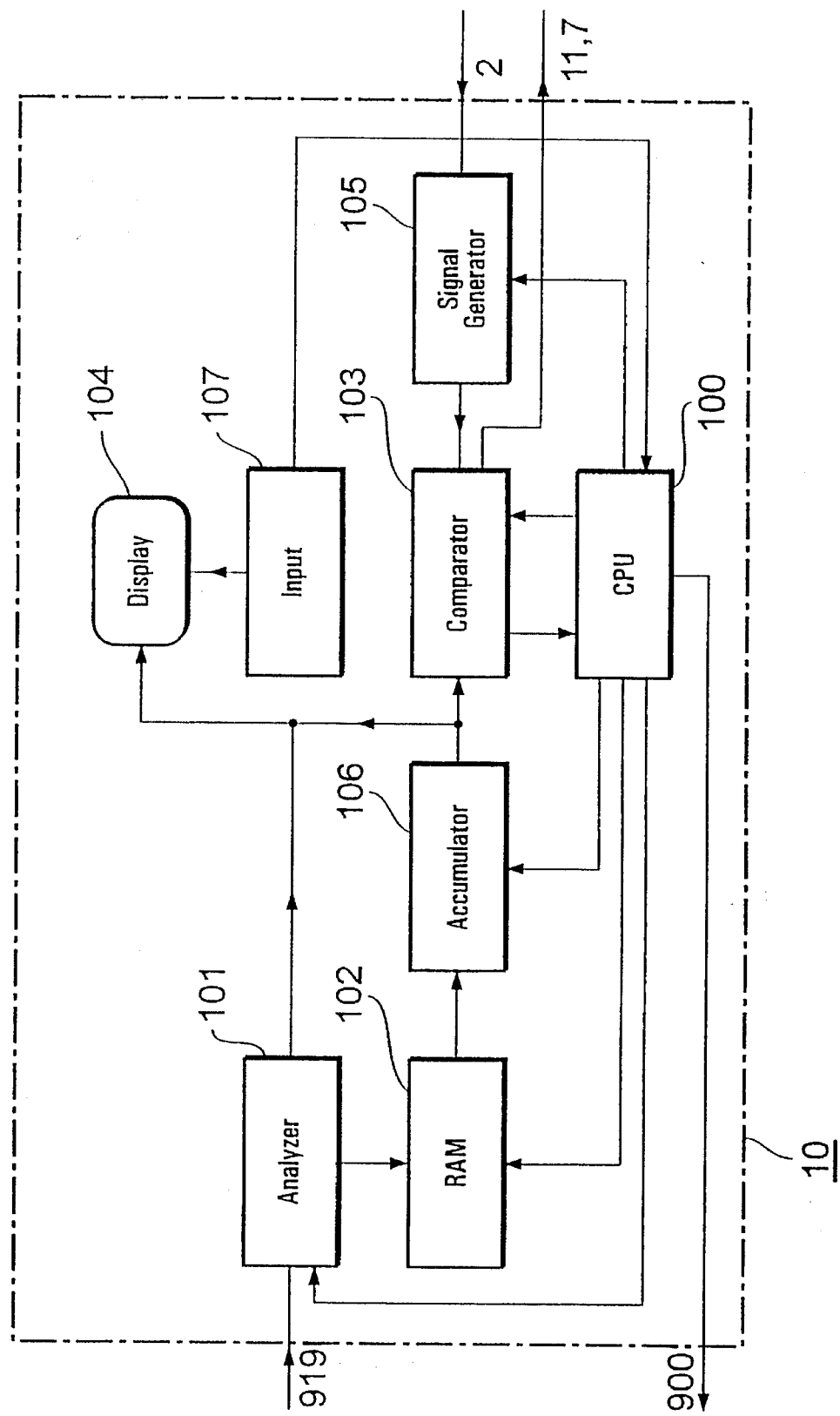

FIG. 1c shows a schematized construction of the signal processing unit 10 in further details. The unit 10 is controlled by a control (CPU) 100, which also controls the control 900 of the transmitting/receiving device 9.

The signal from the band-pass filter 919 passes to a spectral analyser 101 with digital signal processing hardware or software which executes in a known way a fast Fourier transformation of the signal for transforming from the time domain into the frequency domain. The transformed signal is at the same time stored in a RAM 102 and fed to a display 104 for visual display for the operator and to a comparator 103.

The comparator 103 also receives from a calibration signal generator 105 a signal of which the signal-to-noise ratio corresponds to a value required for correct further processing in the comparator 11. This signal is obtained, for example, from model signals 2.3 stored in the memory device 2.

If the signal-to-noise ratio of the measuring signal is less than that of the calibration signal, or than a predetermined minimum value, the comparator emits a signal identifying this fact to the CPU, which thereupon instructs the control 900 of the transmitting/receiving device to execute a further measuring operation. The measuring signal obtained as a result of this in turn passes into the spectral analyser 101, the memory 102 (where it is deposited in a different memory location than the first measuring signal) and the display 104. However, at the initiation of the CPU 100, it does not pass directly to the comparator 103, but is fed jointly with the first measuring signal from the memory 102 to a spectra accumulator 106, known per se, where it is superimposed with the first measuring signal and, as a result, the signal-to-noise ratio is improved. The spectrum obtained in the spectra accumulator 106 is fed to the comparator and checked as to whether it has the required signal-to-noise ratio. If this is the case, the CPU 100 instructs the comparator 100 to output the spectrum to the comparator 11 and instructs the control 900 to wait for a new control command. If the signal-to-noise ratio is not yet adequate, the measurement is repeated and the measuring result accumulated until the required value has been reached or the operation is aborted.

An input device 107 serves for the abortion of the measuring operation and for the input of operator commands controlling the signal processing.

Figure 2:
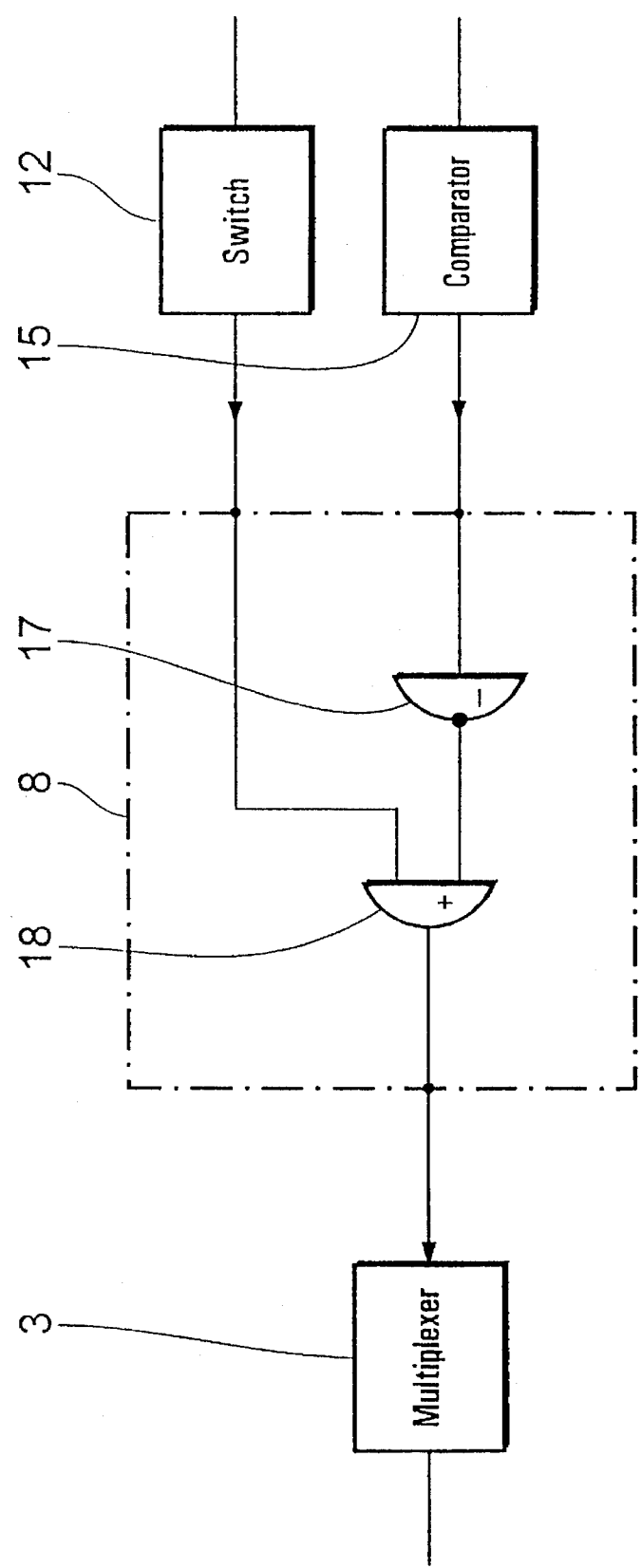
FIG. 2 shows the schematized representation of a detail of the embodiment of the invention shown in FIG. 1.

FIG. 2 shows an advantageous embodiment of the gate circuit 8 described in FIG. 1.

The gate circuit 8 includes an AND gate 18, the inputs of which are connected on the one hand directly to the threshold stage 12 of the first comparator unit (reference 11 in FIG. 1) and on the other hand via a negator 17 to the comparator unit 15 for the control of the measuring locations.

Once the correct location, specific to a building, for the measuring has been taken up, i.e. model and actual recognition signal quantities of the building match, the AND gate 18 switches through, and the cyclical multiplexer 3 stops at the memory location $Z_x$ assigned to the building currently to be subjected to surveillance of the first memory device (reference 2 in FIG. 1), the content of which can be displayed.

Figure 3:
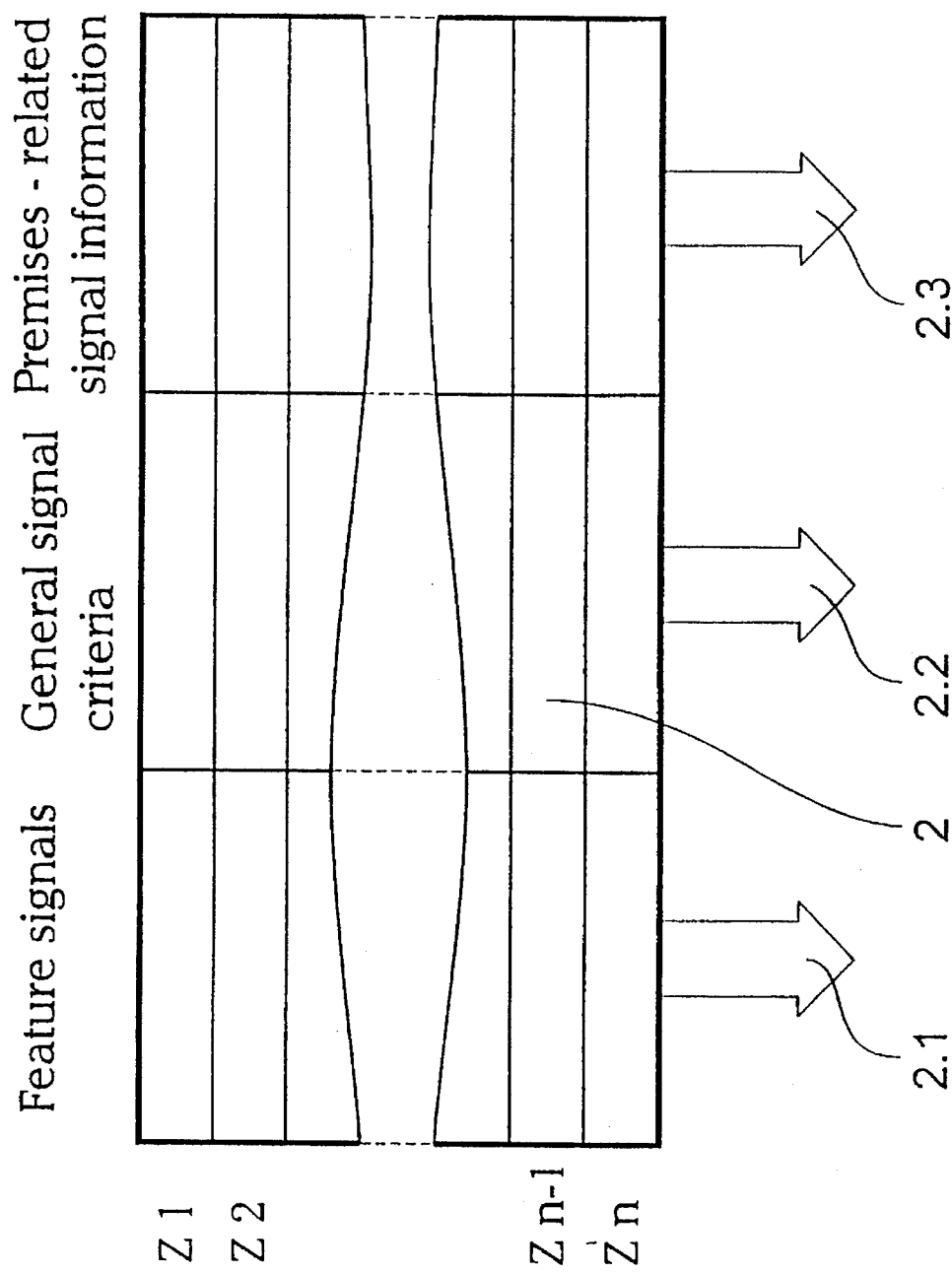
FIG. 3 shows the schematized representation of a first signal memory of the embodiment.
Figure 4:
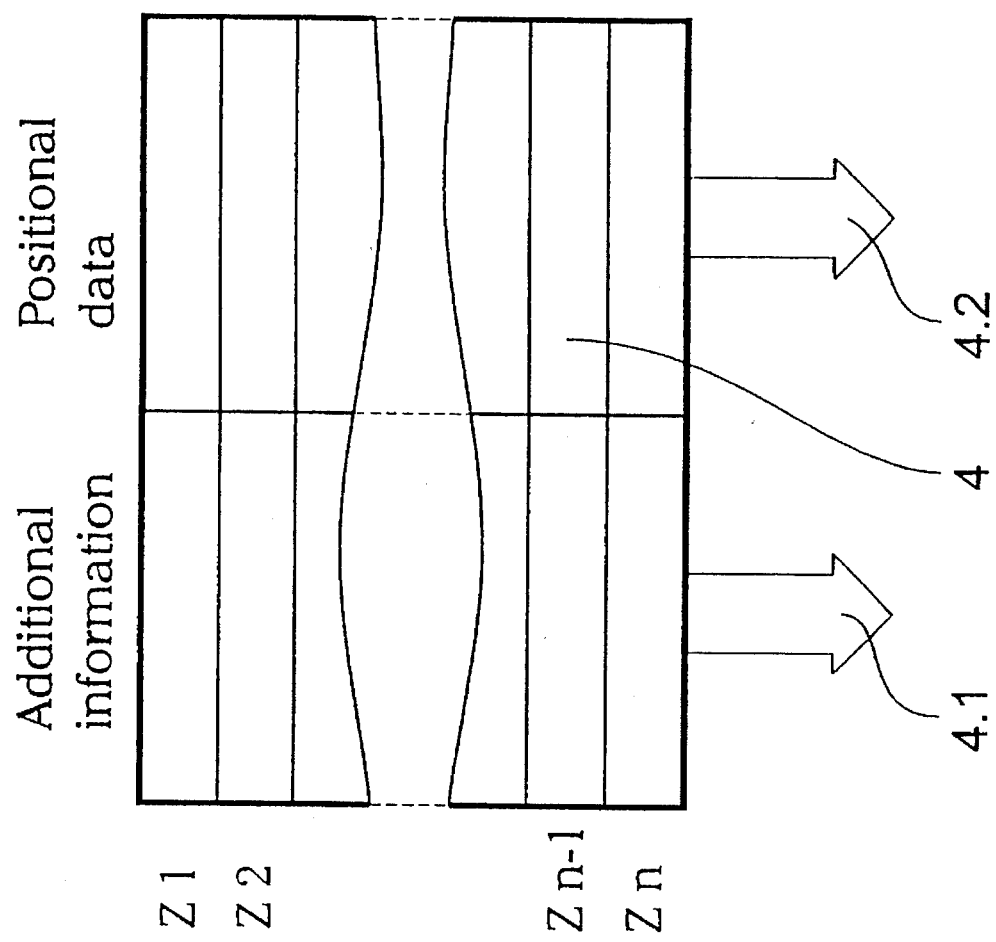
FIG. 4 shows the schematized representation of a second signal memory of the embodiment.

In FIGS. 3 and 4, the construction of the first and second memory devices 2 and 4 is represented in schematized form. For a surveillance area of n buildings, each of the two matrix memories contains n rows which are denoted by $Z_1$ to $Z_n$ and are respectively assigned to one of the buildings. The signal quantities 2.1, 2.2 and 2.3 relate—in this sequence—to building-specific features (feature signal), premises-related security measures (general signal criteria) and body-oscillation spectra of all persons or domestic animals normally present in the building. The matrix memory 4 likewise contains, row by row, assigned to the individual buildings, the positional data 4.2 and additional information 4.1, by which, for example, control times can be predetermined.

Figure 5:
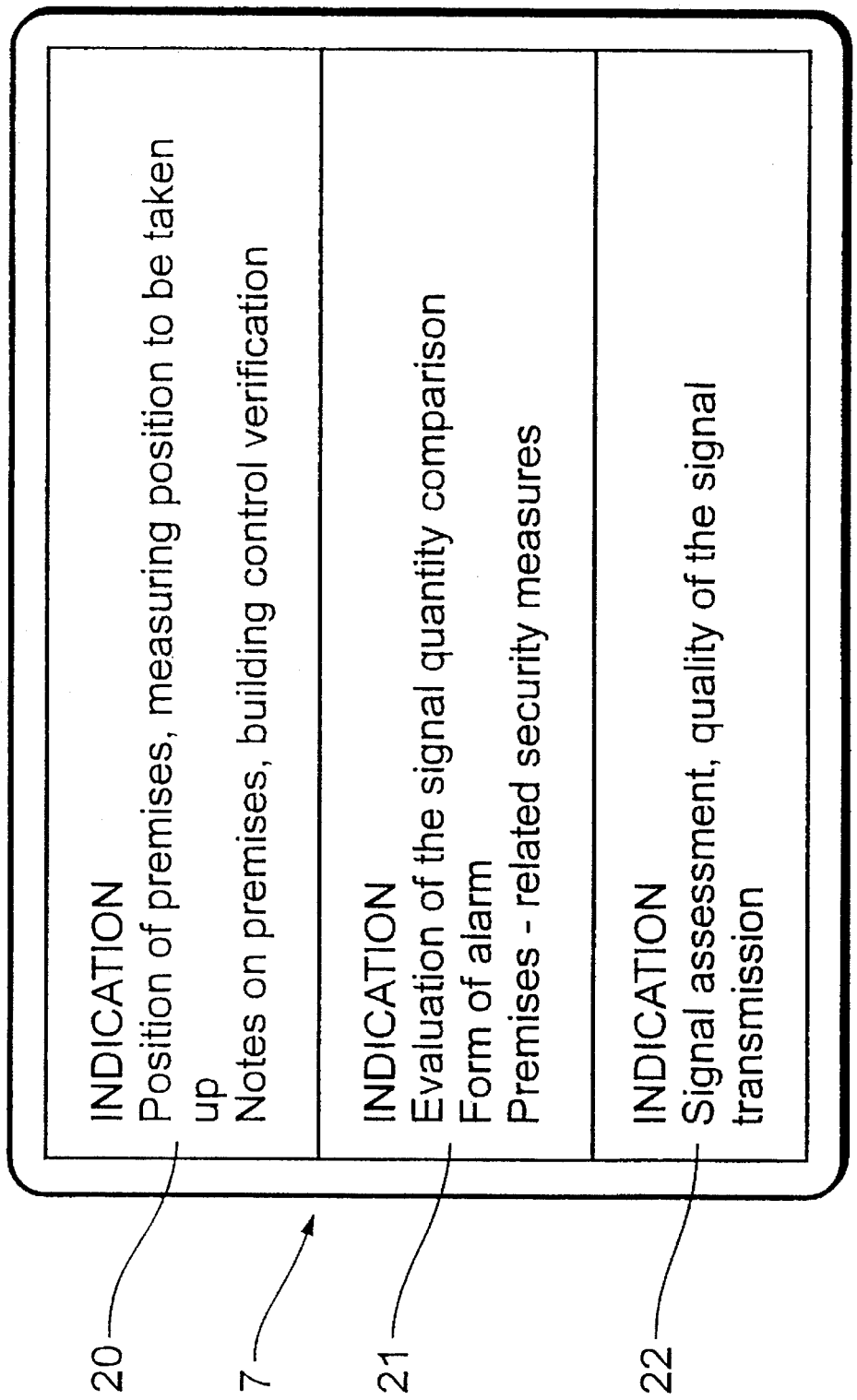
FIG. 5 shows an advantageous configuration of the display device corresponding to the embodiment and FIG. 6 shows a representation of detected signal data which, on the basis of the modulation of reflected microwave components, serve for the detection of persons or domestic animals.

A favourable form of representation of the result of surveillance and—in the event of an alarm—of alarm information is represented in FIG. 5 as a display of the indicating unit 7.

The display is divided into three indicating areas 20, 21, 22 in which textual information is respectively displayed. The upper area 20 is intended for an indication of the position of the building and the measuring locations to be taken up. At the same time, a control note on the surveillance respectively carried out is indicated (and stored). In the middle indicating area 21, there appears in the given case as a result of the evaluation of the model signal quantities with the actual signal quantities an alarm indication and a display of relevant safety measures which are to be carried out in the event of an alarm, taking into account special building-specific circumstances. The third display field 22 serves for indicating the quality of the signal transmission and consequently of the information on the requirement, if need be, for the surveillance operation to be repeated.

Figure 6A:
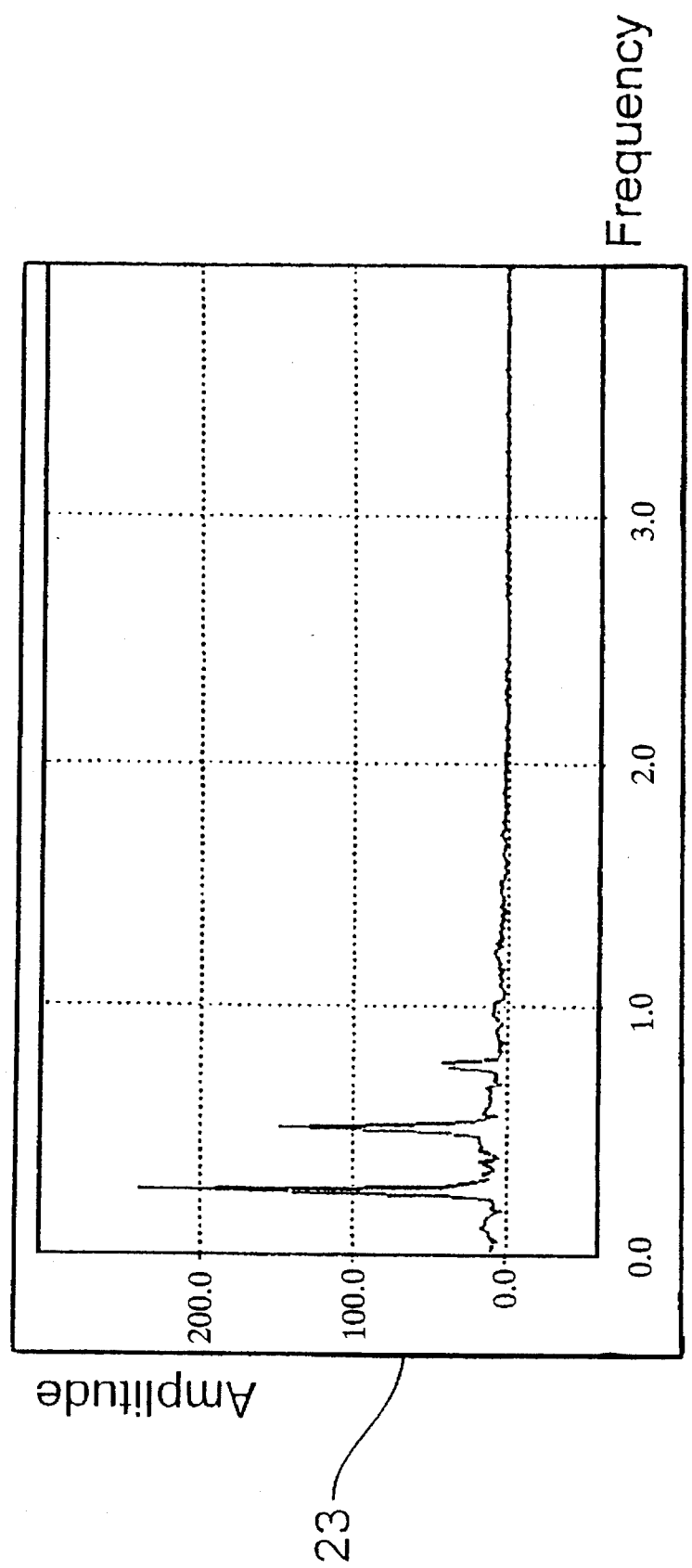
Figure 6B:
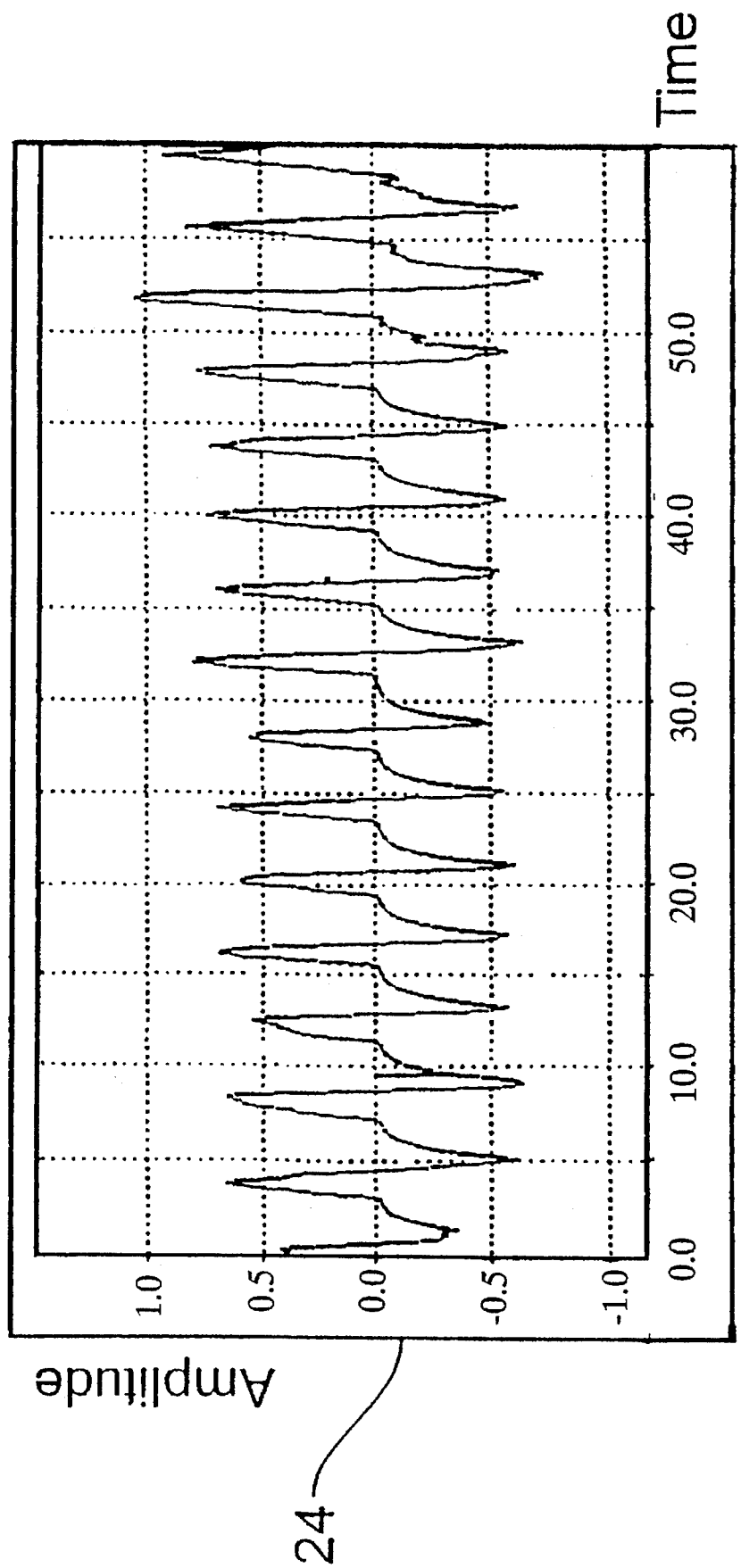

In FIG. 6, to illustrate the measuring principle, the measuring result of a direct microwave detection of the breathing of a person is represented in the form of a diagram. The amplitude-time diagram 24 shows the normal breathing rhythm of a male person for the time range of 1 minute. The frequency spectrum 23 derived from this waveform by means of a Fourier transformation shows in the first quarter of the represented normalised frequency range three characteristic peaks, the frequency position and amplitude value of which are specific to the individual person.

A refined measuring technique allows on this basis the preparation of individual, fingerprint-like body oscillations, the characteristic features of which—in particular frequency components from harmonics—allow the identification of a person even independently of their current breathing and heart rhythm.

On this basis, the model signal quantity underlying a surveillance includes the body-oscillation patterns of all persons and/or animals justifiably present in a building or section of a building in question.

Within the scope of a reference measurement, in which all entitled persons are present in the building, the model signal quantity can be coherently determined or else synthesized from individual, separately recorded body-oscillation spectra of entitled persons. If frequency patterns which are atypical for the authorized persons occur in the measured actual signal quantity, this means the presence of an unauthorized person.

A metrologically less refined surveillance system within the scope of the invention comprises the assignment of an identifying signal generator to each person authorized to be present in a section to be subjected to surveillance, if need be also to domestic animals. Such an identifying signal generator emits an identifying signal which can be sensed by means of the microwave scanning of the area in question, is detected together with the body oscillations of the persons and/or animals authorized to be present in this area and identifies the said persons or animals in the frequency pattern as authorized persons or animals. If components without identifying signal assignment then occur in the frequency pattern, these are to be assigned to an unauthorized person or animal and result in an alarm being set off. In a specific development, the identifying signal generator is an infrasonic transmitter—expediently variable in its frequenc—which delivers a characteristic frequency peak close to the body-oscillation fundamental frequencies, which is easily detectable by the microwave receiver.

In the case of this latter variant, no individual body-oscillation patterns have to be recorded from the authorized persons and/or animals and evaluated, instead a measuring device operating substantially in the range of the fundamental oscillations suffices.

A further development of the invention is that the surveillance system is not mobile but installed in a fixed place. This dispenses with some of the functional groups and process steps described in the above exemplary embodiment, in particular those associated with the correct localisation of the building to be subjected to surveillance and of the measuring vehicle.

The invention is not restricted in its execution to the preferred exemplary embodiment specified above. Rather, a number of variants which make use of the solution presented are conceivable, even in the case of configurations of a fundamentally different type. In particular, it is also possible in such cases to dispense with a directional aerial and its control and to radiate and record the measuring signal by means of simple metal surfaces.

What is claimed is:

1. In an electronic surveillance system for sensing living beings in an area behind a wall or in a building on the basis of a reflection of a wave field radiated into the spatial area to be subjected to surveillance, having a microwave transmitting/receiving device for generating and radiating the wave field, and for receiving and conditioning a signal reflected from the living being, the received signal having a component modulated by the body oscillations of the living being wherein the component comprises a unique oscillation spectra characteristic of that living being and a component unmodulated by the body oscillations of the living being, and a device for outputting a signal indicating presence of a living being, the wave generation, signal receipt, and signal conditioning constituting a measuring operation, the improvement comprising:

a first signal-conditioning device, provided in the microwave transmitting/receiving device, for receiving the microwave signal and eliminating the unmodulated component, a second signal-conditioning device, which receives and further conditions the microwave signal conditioned by said first signal-conditioning device, with a frequency and correlation analysis to supply an actual signal quantity wherein said signal quantity comprises unique oscillation spectra when at least one living being is present in the spatial area, a first memory device for storing and outputting at least one model signal quantity wherein said model signal quantity comprises unique characteristic oscillation spectra when at least one living being is authorized to be present in the spatial area, and a first comparator unit for receiving said actual signal quantity, supplied by said second signal-conditioning device, and said at least one model signal quantity, output from said first memory device, said first comparator unit comparing said actual signal quantity with said at least one model signal and transmitting an output value quantity characterizing the result of the comparison, the output of said comparator unit being connected to the input of the device for outputting a signal, which outputs a signal dependent on the result of the comparison.

2. System according to claim 1, wherein said second signal-conditioning device comprises a processing unit for the execution of a frequency analysis, said processing unit receiving said microwave signal from said first signal-conditioning device, analyzing said signal and transmitting a signal to said comparator unit.

3. System according to claim 1, wherein said second signal-conditioning device has a device for the accumulation of a plurality of successively recorded received signals for the purpose of improving the signal-to-noise ratio.

4. System according to claim 1, wherein said first signal-conditioning device comprises a modulator, an amplification module, a demodulation module, a filtering module, and a generator for generating a modulation voltage wherein the modulated component of the signal is successively modulated, amplified, demodulated and filtered by said modulator, amplification module, demodulation module and filtering module, said generator providing a modulation voltage to said modulator for additional modulation of the modulated component of the signal, said first signal-conditioning device further comprising an automatic gain control circuit and an adding stage wherein said automatic gain control receives a portion of the demodulated signal and transmits said signal portion to said adding stage wherein said signal portion is added to said modulation voltage before said modulation voltage is received by said modulator.

5. System according to claim 1, wherein said at least one model signal quantity stored in said memory device is the result of a measuring and evaluation operation executed in at least one normal state without the presence of living beings.

6. System according to claim 1, wherein the model signal has the characteristic body-oscillation spectrum of a person and of an animal.

7. System according to claim 1, wherein said comparator unit has a device for processing the actual signal quantity and said at least one model signal quantity by a correlation method.

8. System according to claim 1, wherein the microwave transmitting/receiving device is designed for a frequency range of about 1.3 to 1.6 GHz.

9. System according to claim 1, wherein the microwave transmitting/receiving device has an aerial, the aerial having a pronounced directional characteristic and is also able to be swivelled horizontally and vertically.

10. System according to claim 1, wherein the system is arranged in a motor vehicle.

11. System according to claim 1, wherein said first signal conditioning device comprises means to compensate for the unmodulated component wherein a portion of the transmitted signal is adjusted in amplitude and phase and added to the received signal whereby said portion cancels said unmodulated component, producing an output signal composed only of said modulated component, said first signal conditioning device further comprising means for receiving said output signal and controlling the amplitude of said modulated component.

12. System according to claim 1, further comprising means for determining the location coordinates of the transmitting/receiving device, means for storing predetermined coordinates for surveillance locations, and means comprising a third comparator unit for accessing said storage means and comparing said predetermined coordinates with said transmitter/receiving device location coordinates, said third comparator generating a signal to activate the transmitting/receiving device when said predetermined coordinates match said transmitter/receiving device location coordinates.

13. System according to claim 1, wherein said at least one model signal quantity stored in said memory device is the result of a measuring and evaluation operation executed in at least one normal state with the presence of known living beings.

14. System according to claim 1 wherein said model signal quantity comprises characteristic oscillation spectra registered in advance.

15. System according to claim 1 wherein said model signal quantity comprises a normal (model) state of the area to be subjected to surveillance.

16. System according to claim 2, wherein said second signal-conditioning device comprises a device for fast Fourier transformation.

17. System according to claim 3, wherein said device for signal accumulation comprises means for storing measuring signals successively received from said first signal conditioning device, means for summing measuring signals wherein successive measuring signals are added together and define a summed measuring signal, means for generating a calibration signal, said calibration signal being stored in advance and serving as a normal signal with respect to signal-to-noise ratio, means comprising a second comparator unit for comparing a first measuring signal with said calibration signal, means for controlling said means for storing measuring signals, said means for summing measuring signals, said means for generating said calibration signal, said second comparator unit and said transmitting/receiving device wherein said control means controls said second comparator unit to transmit said first measuring signal to said first comparator unit when said first measuring signal is greater than said calibration signal and wherein said control means controls said transmitting/receiving device to initiate successive measuring operations when said calibration signal is greater than said first measuring signal, said control means further controlling said means for summing measuring signals and said second comparator unit wherein said successive measuring signals are added to said first measuring signal and said summed measuring signal is compared to said calibration signal whereby said control means terminates measuring operations and transmits said summed measuring signal to said first comparator unit when said summed measuring signal is greater than said calibration signal.

18. System according to claim 5, characterized in that the identifying signal has the characteristic body-oscillation spectrum of a person.

19. System according to claim 5, characterized in that the identifying signal has the characteristic body-oscillation spectrum of an animal.

* * * * *